(12) United States Patent
Chisholm (10) Patent No.: US 12,269,157 B2
(45) Date of Patent: Apr. 8, 2025

(54) CONTAINER GRIPPER

(71) Applicant: Owens-Brockway Glass Container Inc., Perrysburg, OH (US)

(72) Inventor: Brian J. Chisholm, Sylvania, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 772 days.

(21) Appl. No.: 17/398,124

(22) Filed: Aug. 10, 2021

(65) Prior Publication Data

US 2022/0048201 A1 Feb. 17, 2022

Related U.S. Application Data (60) Provisional application No. 63/065,740, filed on Aug. 14, 2020.

(51) Int. Cl.
B25J 15/00 (2006.01)

(52) U.S. Cl.
CPC ....... B25J 15/0028 (2013.01); B25J 15/0023 (2013.01)

(58) Field of Classification Search
CPC .... B25J 15/0028; B25J 15/0023; B25J 15/08; B25J 15/083
USPC ........................................ 294/106, 86.4, 198
See application file for complete search history.

(56) References Cited

U.S. PATENT DOCUMENTS

| | | | |
|---|---|---|---|
| 1,808,180 A | 6/1931 | Schroder | |
| 3,108,835 A | 10/1963 | Rowekamp | |
| 3,790,205 A | 2/1974 | Wenz | |
| 4,348,044 A | 9/1982 | Wood, III | |
| 4,460,212 A * | 7/1984 | Montferme | B66C 1/62 294/115 |
| 4,768,428 A * | 9/1988 | Silvestrini | A23N 4/04 294/99.1 |
| 4,892,344 A * | 1/1990 | Takada | B25J 15/0266 294/207 |
| 5,234,244 A * | 8/1993 | Kim | B25J 15/0206 294/115 |
| 5,836,633 A * | 11/1998 | Svensson | B23Q 7/043 294/902 |
| 5,895,084 A | 4/1999 | Mauro | |

(Continued)

FOREIGN PATENT DOCUMENTS

| | | |
|---|---|---|
| DE | 9415800 U1 | 2/1996 |
| DE | 29822773 U1 | 1/2000 |

(Continued)

OTHER PUBLICATIONS

Colombian Office Action, Serial No. NC2022/0019286, Applicant: Owens-Brockway Glass Container Inc., Dated: Sep. 24, 2023.

(Continued)

*Primary Examiner* — Paul T Chin (57) ABSTRACT

A container gripper comprises a housing and a petal assembly configured to be carried in the housing assembly. The petal assembly includes a petal holder and a plurality of circumferentially-spaced rigid articulating petals having upper ends pivotably coupled to the petal holder and lower ends configured to be guided by the lower housing of the housing assembly. The petal assembly further includes a travel brace configured to limit the translation of the petal holder, and a return spring between the travel brace and the petal holder.

24 Claims, 8 Drawing Sheets

(56) References Cited

U.S. PATENT DOCUMENTS

| | | | |
|---|---|---|---|
| 6,170,895 B1* | 1/2001 | Schopp | B25J 15/10 |
| | | | 294/203 |
| 6,257,636 B1 | 7/2001 | Hovis et al. | |
| 7,644,902 B1 | 1/2010 | Julian et al. | |
| 8,172,290 B2 | 5/2012 | Nishino et al. | |
| 8,356,848 B2 | 1/2013 | Sarda | |
| 8,672,376 B1 | 3/2014 | Wilson et al. | |
| 9,022,442 B2 | 5/2015 | Rousseau et al. | |
| 9,415,951 B2 | 8/2016 | Fahldieck | |
| 2010/0123325 A1* | 5/2010 | Maffeis | B25J 15/0226 |
| | | | 294/199 |
| 2016/0010870 A1* | 1/2016 | Towner | F24B 15/10 |
| | | | 294/11 |
| 2019/0308822 A1 | 10/2019 | Struijk et al. | |

FOREIGN PATENT DOCUMENTS

| | | |
|---|---|---|
| DE | 20105167 U1 | 3/2002 |
| DE | 10258290 A1 | 7/2004 |
| DE | 102011050772 A1 | 12/2012 |
| DE | 102011051926 A1 | 1/2013 |
| DE | 102016101256 A1 | 7/2017 |
| EP | 0136046 A1 | 4/1985 |
| EP | 0147933 A1 | 7/1985 |
| EP | 0288873 A1 | 11/1988 |
| EP | 3293156 A1 | 3/2018 |
| FR | 67084 E | 11/1957 |
| FR | 2407133 A | 11/1988 |
| NL | 6516846 A | 6/1966 |
| WO | 9206244 A1 | 4/1992 |

OTHER PUBLICATIONS

International Search Report and Written Opinion, Int. Application No. PCT/US2021/045313, Int. Filing Date: Aug. 10, 2021, Mail Date: Dec. 1, 2021.

* cited by examiner

CONTAINER GRIPPER

TECHNICAL FIELD

The present application discloses innovations to gripper mechanisms for gripping articles and, more particularly, to gripper mechanisms for grasping and holding containers, for example, bottles, having different container finish sizes and types.

BACKGROUND

A container manufacturing process may include one or more stages in which various markings may be applied to the container. These markings may include, for example and without limitation, one or more codes (e.g., barcodes, QR codes, etc.) representing information relating to, for example, the manufacturing of the container, the contents of the container, and/or the container itself. One way in which markings may be applied to a container is by using a digital printing process to apply the markings directly to the outer surface of the container.

To digitally print markings on a container, a container gripper is used to grasp, hold, rotate, and/or move the container as required to carry out the printing operation. One type of conventional gripper that may be used includes a housing, a gripper assembly carried within the housing that may include a plurality of rubber fingers or petals to grasp a container at or below the finish of the container, a pneumatic valve that when opened causes the gripper assembly to be lowered or moved in a downward direction toward a container to be gripped, and a return spring that causes the gripper assembly to be raised/retracted or moved in an upward direction away from the container when the pneumatic valve is closed.

When the pneumatic valve is opened and the petal assembly is lowered, the rubber petals slide along a cam surface of the housing that causes the petals to move inwardly toward the central axis of the gripper assembly and each other, thereby closing the petals around the neck finish of the container. However, if the rubber petals travel too far in the downward direction, they may deflect down the neck of the container and, in some cases, get wedged between the container and a housing of the gripper. When one or more petals gets wedged in this manner the gripper may not retract when the pneumatic valve is closed and the container being held by the petals may not be released. Additionally, in conventional grippers, the size tolerance for containers is relatively small. For containers outside of a given range for a gripper, replacement parts are needed to accommodate those containers, which is both expensive and time consuming.

BRIEF SUMMARY OF THE DISCLOSURE

The present disclosure embodies a number of aspects that can be implemented separately from, or in combination with, each other.

A container gripper in accordance with one aspect of the disclosure comprises a housing and a petal assembly configured to be carried in the housing assembly. The petal assembly includes a petal holder and a plurality of circumferentially-spaced rigid articulating petals having upper ends pivotably coupled to the petal holder and lower ends configured to be guided by the lower housing of the housing assembly. The petal assembly further includes a travel brace configured to limit the translation of the petal holder, and a return spring between the travel brace and the petal holder.

In accordance with another aspect of the disclosure, a container gripper includes a housing and a petal assembly configured to be carried in the housing. The petal assembly includes a petal holder, a plurality of circumferentially-spaced articulating petals each having an upper end pivotably coupled to the petal holder, a lower end configured to be guided by the lower housing of the housing assembly, and a magnet, a travel brace configured to limit the translation of the petal holder and including a plurality of magnets, and a return spring between the travel brace and the petal holder. When the petal assembly is in a retracted state, each petal is pushed radially outwardly by a repelling magnetic force generated between the magnet in the petal and a respective magnet of the travel base.

In accordance with yet another aspect of the disclosure, a container gripper includes a housing and a petal assembly configured to be carried in the housing. The petal assembly includes a seal block, a petal holder configured to be coupled to the seal block wherein the petal holder and the seal block are configured to be translatably carried in the housing, and a plurality of circumferentially-spaced rigid articulating petals each having an upper end pivotably coupled to the petal holder, a lower end configured to be guided by the lower housing of the housing assembly, and a magnet. The petal assembly further includes a travel brace configured to limit the translation of the seal block and petal holder and including a plurality of magnets, and a return spring configured to be held between the travel brace and the seal block and/or petal holder. When the petal assembly is in a retracted state, each petal is pushed radially outwardly by a repelling magnetic force generated between the magnet in the petal and a respective magnet of the travel base.

BRIEF DESCRIPTION OF THE DRAWINGS

FIGS. 11 and 12 are cross sectional views of a gripper comprising the petal holder illustrated in FIG. 6, a plurality of the petals illustrated in FIG. 7, and the travel brace illustrated in FIGS. 8-10, wherein FIG. 11 illustrates the gripper in a home, up, or retracted state, and FIG. 12 illustrates the gripper in an advanced or down state.

DETAILED DESCRIPTION

The container gripper described herein is configured to accommodate containers having different sizes and/or types of finishes. It is also configured to limit the distance of travel of various components of a petal assembly thereof, and to prevent the petals of the petal assembly from deflecting against the neck of a container and getting wedged between the container and a housing of the gripper mechanism during operation of the container gripper.

Figure 1:
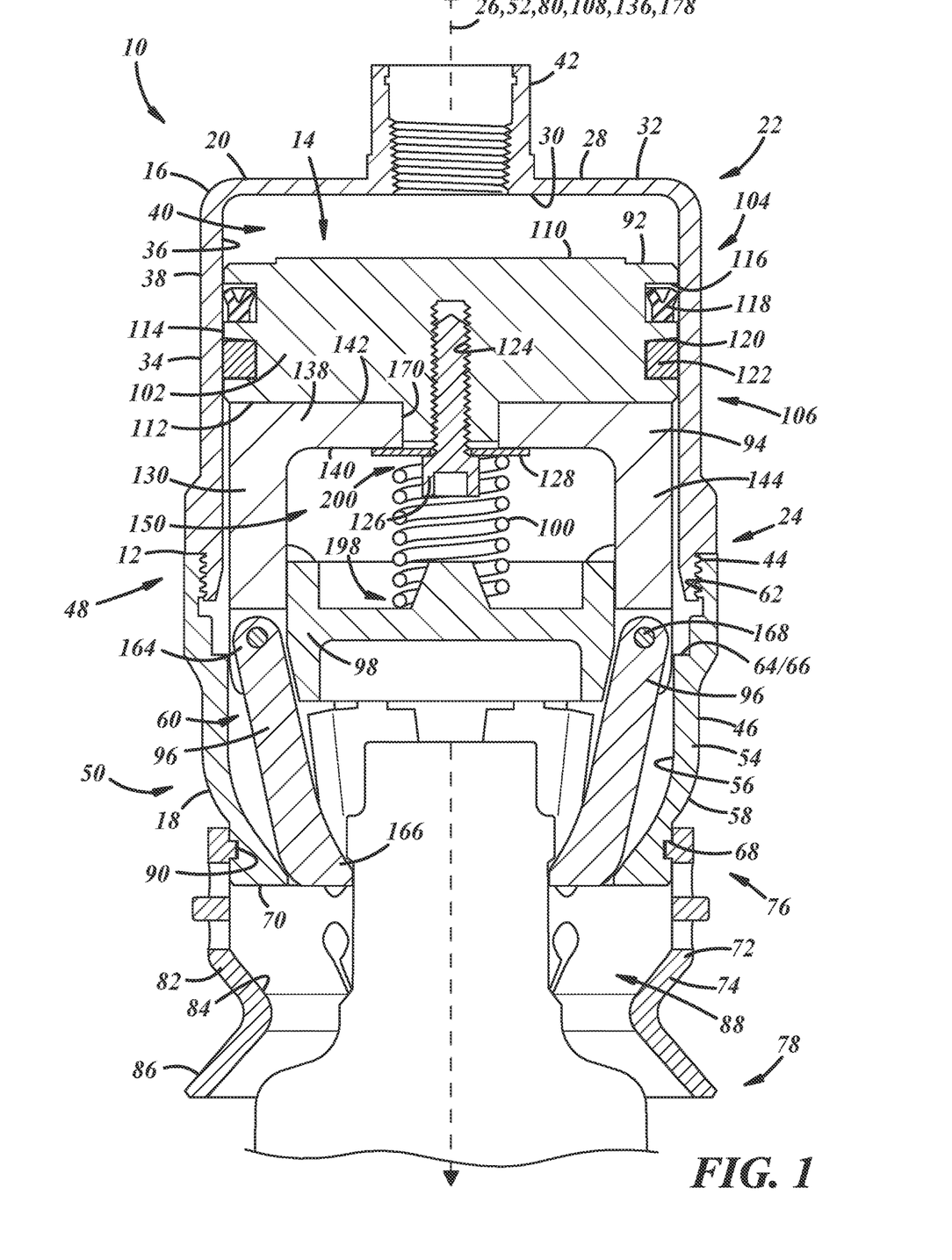
FIG. 1 is a cross sectional view of an illustrative embodiment of a container gripper.

With specific reference to the drawing figures, FIG. 1 shows an illustrative embodiment of a container gripper 10. The gripper 10 generally comprises a housing 12 and a petal assembly 14 configured to be translatably carried in the housing 12.

The housing 12 may be a one-piece housing or may comprise an assembly of two or more pieces. In the latter instance, the housing 12 may comprise an assembly of any suitable number of pieces that are coupled or connected together in any suitable manner. In an illustrative embodiment, the housing 12 (also referred to below as housing assembly 12) is comprised of an upper housing 16 and a lower housing 18 configured to be coupled to the upper housing 16. The upper housing 16 includes a body 20 having a first or upper end 22, a second or lower end 24, and a longitudinal axis 26 extending through and between the upper and lower ends 22, 24. The body 20 further includes a base 28 disposed at the upper end 22 thereof having an inner or interior surface 30 and an outer or exterior surface 32, a sidewall 34 extending from the base 28 and terminating at the lower end 24 of the body 20 that has an inner or interior surface 36 and an outer or exterior surface 38, and a void or cavity 40 defined by the interior surface 36 of the sidewall 34 and the interior surface 30 of the base 28. The upper housing 16 further includes a pneumatic port 42 located at the upper end 22 of the body 20 and extending through the base 28 thereby providing access into the cavity 40 to allow, as will be described more fully below, a pressure chamber to be established within the cavity 40. The pneumatic port 42 is configured to be coupled (e.g., threadably coupled) with a tube or other suitable conduit to supply fluid under pressure (e.g., air) to the cavity 40. As will be described more fully below, in at least some embodiments a portion of exterior surface 38 of the sidewall 34 at the lower end 24 of the of the upper housing body 20 may comprise a plurality of threads 44 to facilitate the coupling of the upper housing 16 with or to the lower housing 18.

Similar to the upper housing 16, the lower housing 18 includes a body 46 having a first or upper end 48, a second or lower end 50, and a longitudinal axis 52 extending through and between the upper and lower ends 48, 50 that, when the upper and lower housings 16, 18 are coupled together as illustrated in FIG. 1, is parallel to and coincident with the longitudinal axis 26 of the upper housing body 20. The lower housing body 46 has a sidewall 54 extending between the upper and lower ends 48, 50 thereof that has an inner or interior surface 56 and an exterior surface 58, and a cavity 60 defined by the sidewall interior surface 56. In an embodiment, a portion of the interior surface 56 at the upper end 48 of the lower housing body 46 may comprise a plurality of threads 62 that are complementary with the threads 44 at the lower end 24 of the upper housing body 20 to facilitate the coupling of the lower housing 18 with or to the upper housing 16.

As shown in FIG. 1, in an embodiment the lower end 50 of the lower housing body 46 is diametrically smaller than the upper end 48. More particularly, in an embodiment, the inner diameter of the lower housing body 46 (i.e., the diameter of the cavity 60) progressively narrows at the lower end 50 thereof as the sidewall 54 extends further away from the upper end 48 of the lower housing body 46 in an axial direction relative to the longitudinal axis 52. In other words, in at least some embodiments, a portion of the interior surface 56 of the sidewall 54 at the lower end 50 of the lower housing body 46 angles radially inwardly such that the diameter of the lower housing body 46 at the lower end 50 progressively narrows as it extends axially away from the upper end 48 of the lower housing body 46. In any event, when the upper and lower housings 16, 18 are coupled together as shown in FIG. 1, the upper end 48 of the lower housing body 46 becomes a fixed end of the lower housing 18, and the lower end 50 comprises a free end of the lower housing 18.

In addition to the above, the lower housing body 46 includes at least one interior shoulder or ledge 64 formed in and/or extending radially inwardly from the interior surface 56 of sidewall 54. The shoulder 64 comprises an engagement surface 66 facing in an axial direction toward the upper end 48 of the lower housing body 46 and away from the lower end 50. The shoulder 64 is disposed between the upper and lower ends 48, 50 of the lower housing body 46, and in an illustrative embodiment, between the upper end 48 and the point at which the interior surface 56 of the sidewall 54 begins to angle radially inwardly. In an embodiment, the lower housing 18 includes a single shoulder 64 that extends continuously about the entire inner circumference of the lower housing body 46. In other embodiments, however, the lower housing 18 may include a plurality of circumferentially-extending and circumferentially-spaced shoulders 64, none of which extend about the entire inner circumference of the lower housing body 46. In either instance, and as will be described more fully below, the shoulder(s) 64 is configured to engage and support a component of the petal assembly 14 of the gripper 10 (e.g., a travel brace) during operation of the gripper 10.

In an embodiment such as that shown in FIG. 1, the lower housing 18 may also include one or more radially inwardly and circumferentially-extending grooves 68 in the exterior surface 58 of the sidewall 54 of the lower housing body 46 at the lower end 50 thereof, and an axially-facing surface 70 that is axially-spaced from the groove(s) 68 and faces away from the upper end 48 of the lower housing body 46. In an embodiment, the lower housing 18 includes a single groove 68 that extends continuously about the entire outer circumference of the lower housing body 46. In other embodiments, however, the lower housing 18 may include a plurality of circumferentially-extending and circumferentially-spaced grooves 68. In either instance, and as will be described more fully below, the groove(s) 68 is configured to facilitate the coupling of a container guide with or to the lower housing 18.

In an embodiment, the upper and lower housings 16, 18 of the housing assembly 12 are formed of steel. It will be appreciated, however, that in other embodiments, one or both of the upper and lower housings 16, 18 may be formed of a suitable material other than steel, and that the upper and lower housings 16, 18 may be formed of the same or different materials.

As briefly described above, in addition to the upper and lower housings 16, 18, in at least some embodiments, the housing assembly 12 may further include a container guide 72 coupled to, for example, the lower housing 18 at the lower end 50 of the lower housing body 46. While the description herein will be with respect to an embodiment wherein the container guide 72 is considered to be a constituent part of the housing assembly 12, in other embodiments, the container guide 72 may be considered to be a separate part of the gripper 10 and not part of the housing assembly 12 per se. Such embodiments remain within the spirt and scope of the present disclosure.

In any event, in an embodiment wherein the gripper 10 includes the container guide 72, the container guide 72 is configured to guide and locate the gripper 10 relative to a container to be gripped by the gripper 10 or vice versa such that the container and gripper 10 are appropriately aligned for operation of the gripper 10. The container guide 72 comprises a body 74 having first or upper end 76, a second or lower end 78, and a longitudinal axis 80 extending through and between the upper and lower ends 76, 78. The body 74 has a sidewall 82 extending between the upper and lower ends 76, 78 of the body 74 that has an inner or interior 84 surface and an outer or exterior surface 86, and a void or cavity 88 defined by the interior surface 84 of the sidewall 82.

In an embodiment, the upper end 76 of the container guide body 74 is coupled to the lower end 50 of the body 46 of the lower housing 18. These components may be coupled in any number of suitable ways known in the art. For example, in an embodiment the body 74 of the container guide 72 includes one or more radially inwardly-extending projections 90 that is/are configured to be mated with the groove(s) 68 in the outer surface 58 of the sidewall 54 of the lower housing body 46. In an embodiment, the projection(s) 90 of the container guide 72 are located at the upper end 76 of the container guide body 74, and the groove(s) 68 of the lower housing 18 are located at the lower end 50 of the lower housing body 46. Depending on the embodiment, the projection(s) 90 and/or groove(s) 68 may comprise a single projection and groove each extending circumferentially continuously about the inner surface of the container guide body 74 and the outer surface 58 of the lower housing body 46, respectively, or may comprise a plurality of circumferentially-extending and circumferentially-spaced projections and/or grooves. In other embodiments, each of the inner surface 84 of the container guide body 74 and the outer surface 58 of the lower housing body 46 may comprise or carry a plurality of threads that are complementary to each other to facilitate the coupling of the container guide 72 with the lower housing 18. Accordingly, any number of suitable techniques or arrangements may be used to couple the container guide 72 with the lower housing 18 and the present disclosure is not intended to be limited to any particular technique(s) or arrangement(s).

As shown in FIG. 1, in at least some embodiments the inner diameter of the container guide body 74 (i.e., the diameter of the cavity 88) progressively narrows at the lower end 78 thereof as the sidewall 82 extends further towards the upper end 76 of the container guide body 74 in an axial direction relative to the longitudinal axis 80. In other words, in at least some embodiments, a portion of the inner surface 84 of the sidewall 82 at the lower end 78 of the container guide body 74 angles radially inwardly such that the inner diameter of the lower end 78 of the container guide body 74 progressively narrows as it extends axially toward the upper end 76 of the container guide body 74. In such embodiments, the inner surface 84 of the sidewall 82 in the progressively narrowing portion of the container guide body 74 may serve as a cam surface to guide, for example, the gripper 10, and the petal assembly 14 thereof, in particular, over the neck finish and into appropriate alignment with the neck finish, or vice versa.

With continued reference to FIG. 1, in an illustrative embodiment, the petal assembly 14 includes a seal block 92, petal holder 94 coupled, for instance, fastened, to the seal block 92, a plurality of circumferentially-spaced articulating petals 96 coupled to the petal holder 94 (also shown in FIG. 2), a travel brace 98 (also shown in FIG. 3), and a return spring 100. It will be appreciated that in while in at least some embodiments the petal assembly 14 includes all of the above-identified components, in other embodiments the petal assembly 14 may include fewer or more than the above-identified components (e.g., the petal assembly may not comprise a separate seal block), two or more components may be integrated as a single component (e.g., the seal block and petal holder may be integrated as a single component with a first portion functioning as the seal block and a second portion functioning as the petal holder), and/or one or more of the components may be separate from the petal assembly 14 or be part of a different assembly of the gripper 10. Accordingly, while the description of the petal assembly 14 below is with respect to an embodiment wherein the petal assembly comprises all of the aforementioned components, embodiments wherein the petal assembly comprises less than all of (or more than) those components remain within the spirit and scope of the present disclosure.

In the embodiment depicted in FIG. 1, the seal block 92 is configured to be translatably carried in the upper housing 16 of the housing assembly 12, and in the cavity 40 thereof, in particular. That is, the seal block 92 is configured to travel or translate within the cavity 40 along the longitudinal axis 26 of the upper housing 16. The seal block 92 has a body 102 that has a first or upper end 104, a second or lower end 106, and a longitudinal axis 108 extending between and through the upper and lower ends 104, 106. The body 102 may further include a first axially-facing surface 110 at the upper end 104, a second axially-facing surface 112 at the second end 106 facing in the opposite direction as the first axially-facing surface 110, and a radially-facing circumferentially-extending surface 114 disposed and extending between the first and second axially-facing surfaces 110, 112. Since the seal block 92 is configured to be translatably carried in the upper housing 16 of the housing assembly 12, in an embodiment wherein the seal block body 102 has a cylindrical shape, and thus, a circular cross-section, the outer diameter of the body 102 is equal to or less than the inner diameter of the upper housing 16.

The seal block 92 is configured to create a seal between the petal assembly 14 and the interior or cavity 40 of the upper housing 16 so that when fluid is introduced into the cavity 40 during operation of the gripper 10, a pressure chamber is established within the cavity 40. In order to facilitate the creation of a seal, in at least some embodiments, such as, for example, that illustrated in FIG. 1, the body 102 of the seal block 92 includes a circumferentially and radially-extending groove 116 in the radially-facing surface 114 of the body 102 that is configured to receive a seal ring 118 (e.g., a pneumatic seal). The groove 116 may be located anywhere along the longitudinal extent of the surface 114. In the illustrative embodiment shown in FIG. 1, however, the groove 116 is located adjacent to the first axially-facing surface 110 at the upper end 104 of the seal block body 102. Regardless of the location of the groove 116, when the seal ring 118 is disposed within the groove 116, a seal is formed between the interior surface 36 of the upper housing 16 and the seal block 92.

In addition to the above, the seal block body 102 may further include a second groove 120 axially-spaced from the first groove 116 that is also circumferentially and radially-extending and that is configured to receive a guide ring 122. As with the groove 116, the groove 120 may be located anywhere along the longitudinal extent of the surface 114. In the illustrative embodiment shown in FIG. 1, however, the groove 120 is located adjacent to the second axially-facing surface 112 at the lower end 106 of the seal block body 102.

As briefly discussed above, and as will be described more fully below, the seal block 92 is configured to be coupled to the petal holder 94 of the petal assembly 14. To facilitate this coupling, the seal block body 102 may include a threaded bore 124 extending in the seal block body 102 from the second axially-facing surface 112 thereof toward the upper end 104 and first axially-facing surface 110. The threaded bore 124 is configured to receive and be mated with a complementary threaded bolt or screw 126 to couple the petal holder 94 with the seal block 92. As shown in FIG. 1, a washer 128 may also be used in the coupling or fastening of the seal block 92 with the petal holder 94.

Figure 2:
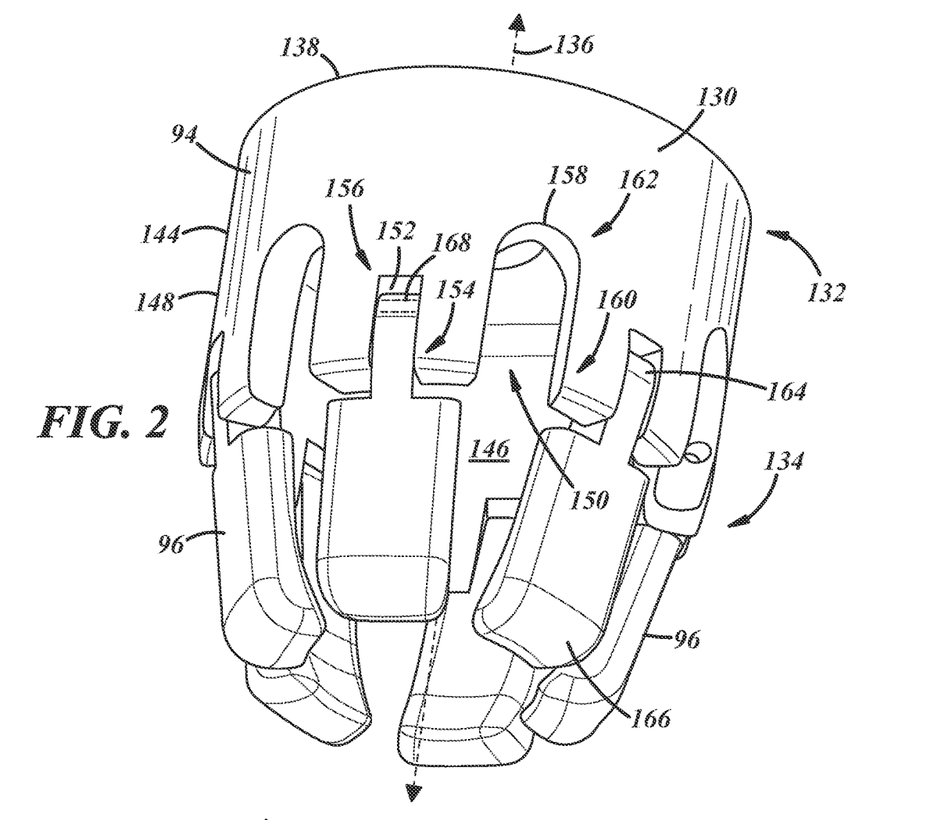
FIG. 2 is a perspective view of an illustrative embodiment of a petal assembly for a container gripper such as that illustrated in FIG. 1.

FIGS. 1 and 2 depict an illustrative embodiment of the petal holder 94 and petals 96 of the petal assembly 14. With particular reference to FIG. 2, the petal holder 94 includes a body 130 having first or upper end 132, a second or lower end 134, and a longitudinal axis 136 extending through and between the upper and lower ends 132, 134. As best shown in FIG. 1, the petal holder body 130 may further include a base 138 disposed at the upper end 132 thereof having an axially-facing inner or interior surface 140 and an axially-facing outer or exterior surface 142 facing in an opposite direction as the interior surface 140, a sidewall 144 extending from the base 138 and terminating at the lower end 134 of the body 130 that has a radially inwardly-facing inner or interior surface 146 and a radially outwardly-facing outer or exterior surface 148, and a void or cavity 150 defined by the interior surface 146 of the sidewall 144 and/or the interior surface 140 of the base 138. In other embodiments, the petal holder 94 may not have a base with interior and exterior facing surfaces, but rather both the upper and lower ends of the body may be open.

As best shown in FIG. 2, the petal holder 94 further includes a plurality of petal notches or slots 152 located at the lower end 134 of the petal holder body 130. Each petal notch 152 is configured to receive a portion of a corresponding petal 96. The petal notches 152 are circumferentially-spaced about the petal holder body 130, and each extends in an axial direction toward the upper end 132 of the petal holder body 130 from an open end 154 at the lowermost point of the petal holder body 130 to a closed end 156 proximal of the lowermost point and between the lowermost point and the upper end 132 of the body 130.

In an illustrative embodiment, the petal holder 94 may further include one or more lobe notches or slots 158 also located at the lower end 134 of the petal holder body 130. Each lobe notch 158 is configured to receive a lobe of the travel brace 98 of the petal assembly 14, as will be described in greater detail below. In such an embodiment, the lobe notches 158 may be circumferentially-spaced about the petal holder body 130, and each extends in an axial direction toward the upper end 132 of the petal holder body 130 from an open end 160 at the lowermost point of the petal holder body 130 to a closed end 162 proximal of the lowermost point and between the lowermost point and the upper end 132 of the body 130. In an embodiment wherein the petal holder 94 includes one or more lobe notches 158, each lobe notch 158 may be located between a pair of petal notches 152 and vice versa.

As with the seal block 92 described above, the petal holder 94 is also configured to be translatably carried in the housing assembly 12 of the gripper 10, and the cavity 40 of the upper housing 16 and/or the cavity 60 of the lower housing 18, in particular. As such, in an embodiment wherein the petal holder body 130 has a cylindrical shape, and thus, a circular cross-section, the outer diameter of the body 130 is equal to or less than the inner diameters of the upper and lower housings 16, 18 of the housing assembly 12 (i.e., the diameter of the cavity 40 and/or the diameter of the cavity 60).

As described above, the plurality of circumferentially-spaced petals 96 of the petal assembly 14 are configured to be coupled to the petal holder 94. Each petal 96 has an upper end 164 and a lower end 166. In an embodiment, the upper ends 164 of the petals 96 are configured to be pivotably coupled to the petal holder 94. And in at least some embodiments, the petals 96 are formed of a rigid material so that they do not bend or deflect during operation of the gripper 10. In such an embodiment, the rigid petals 96 may be produced in part using additive manufacturing (e.g., 3D printing) to reduce costs and timing, though other manufacturing techniques may certainly be used. In the embodiment illustrated in FIGS. 1 and 2, each petal 96 is configured to be received in a respective petal notch 152 in the petal body 130, and pivotably coupled to the housing 130 within the petal notch 152 by a pivot pin 168 (best shown in FIG. 1). The petals 96 are configured to freely rotate or articulate about the pivot pin 168. The lower ends 166 of the petals 96 are configured to be guided by the lower housing 18 of the housing assembly 12 when the petal assembly 14 is assembled with the housing assembly 12. More specifically, and as will be described in greater detail below, as the petal assembly 14 translates in the housing assembly 12, the interior surface 56 of the lower housing 18 acts as a cam surface along which the lower ends 166 of the petals 96 travel. The angled or inclined nature of the interior surface 56 of the lower housing 18 guides or causes the petals to move radially inwardly as the petal assembly 14 travels in the direction toward a container to be gripped, and guides or causes the petals 96 to move radially outwardly as the petal assembly 14 travels in a direction away from the container to be gripped.

As discussed above and as shown in FIG. 1, in an embodiment wherein the gripper 10 includes both the seal block 92 and the petal holder 94, the petal holder 94 is configured to be coupled or fastened to the seal block 92. In such an embodiment, the petal holder 94 may include a throughbore 170 in the base 138 thereof that is configured to receive a portion of the seal block body 102 having the threaded bore 124 disposed therein. When the portion of the seal block body 102 having the bore 124 disposed therein is received in the bore 170, the screw or bolt 126 and washer 128 can be used to facilitate the coupling or fastening of the petal holder 94 with the seal block 92. While one particular way of coupling or fastening the seal block with the petal holder has been described, it will be appreciated that the two components may be coupled or fastened in any number of suitable ways and/or using one or more different suitable coupling arrangements, and thus, the present disclosure is not intended to be limited to any particular way(s) or arrangement(s).

Figure 3:
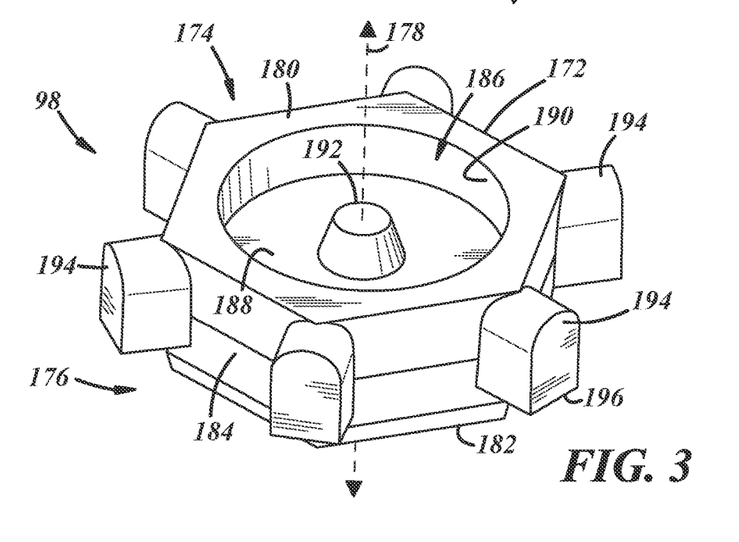
FIG. 3 is a perspective view of an illustrative embodiment of a travel brace of a petal assembly such as that illustrated in FIG. 2 of a container gripper such as that illustrated in FIG. 1.

With reference to FIGS. 1 and 3, the travel brace 98 of the petal assembly 14 is configured to be disposed in the housing assembly 12 (e.g., at least partially in the lower housing 18) and, in an embodiment, in the petal holder 94. More specifically, in at least some embodiments, the travel brace 98 is configured to be disposed at least partially in the cavity 150 of the petal holder 94, and, in at least some embodiments, one or both of the travel brace 98 and the petal holder 94 may be configured for translation relative to the other. As will be described more fully below, the travel brace 98 is also configured to limit the translation of the petal assembly 14, and the seal block 92 and/or petal holder 94 thereof, in particular, when the petal assembly 14 is assembled with the housing assembly 16.

In an embodiment such as that shown in FIG. 3, the travel brace 98 comprises a body 172 having a first or upper end 174, a second or lower end 176, and a longitudinal axis 178 extending between and through the upper and lower ends 174, 176. The body may further include a first axially-facing surface 180 at the upper end 174, a second axially-facing surface 182 at the lower end 176 facing in the opposite direction as the first axially-facing surface 180, and a radially-facing circumferentially-extending surface 184 disposed and extending axially between the first and second axially-facing surfaces 180, 182. Because in at least some embodiments the travel brace 98 is configured to be disposed in the cavity 150 of the petal holder 94, the travel brace body 172 is sufficiently sized and shaped to be received in the cavity 150. In the embodiment illustrated in FIG. 3, the travel brace body 172 has a hexagonal shape having six sides and six vertices. It will be appreciated, however, that the body 172 may have any suitable shape (e.g., circular) and as such, the present disclosure is not limited to any particular shape(s).

In an embodiment, the travel brace 98 may further include a recess 186 in the body 172 at the upper end 174 thereof. The recess 186 is disposed radially inwardly of the first axially-facing surface 180 and extends axially into the body 172 from the first axially-facing surface 180 toward the lower end 176 and second axially-facing surface 182 of the travel brace body 172. The recess 186 may be defined by an axially-facing base surface 188 and a radially inwardly-facing sidewall 190.

In an embodiment, the travel brace 98 may further include a centering post 192 for locating the return spring 100 when the petal assembly 14 is assembled with the housing assembly 12. As shown in FIG. 3, the centering post 192 may extend or project from the base surface 188 of the recess 186 in an axial direction toward the first axially-facing surface 180 of the travel brace body 174. In an embodiment, the centering post 192 has a conical or frusto-conical shape, though the present disclosure is not intended to be limited to any particular shape of the centering post.

In an embodiment such as that illustrated in FIGS. 1 and 3, the travel brace 98 further include one or more lobes 194 extending radially outwardly from the travel brace body 172 that is/are configured to engage and rest against the shoulder/ledge 64. For example, in the embodiment illustrated in FIG. 3, the travel brace 98 includes a plurality of lobes 194 extending from the radially outwardly-facing surface 184 of the travel brace body 172. In an embodiment wherein the travel brace 98 includes a plurality of lobes 194, the lobes may be circumferentially or laterally-spaced about the travel brace body 172. For example, in the illustrative embodiment depicted in FIG. 3 wherein the travel brace body 172 has a hexagonal shape, the travel brace 98 includes six lobes 194 each located at a respective corner or vertex of the travel brace body 172.

In any event, in an embodiment, each lobe 194 has an axially-facing bottom surface 196 that faces in the same direction as the second axially-facing surface 182 of the travel brace body 172 and away from the first axially-facing surface 180. The bottom surface 196 is configured to engage and rest against the shoulder/ledge 64, and the engagement surface 66 thereof, in particular, of the lower housing 18. Depending on the embodiment, the bottom surface 196 of the lobe(s) 194 may or may not be coplanar with the second axially-facing surface 182 of the travel brace body 172. For example, in the embodiment shown in FIG. 3, while the bottom surface 196 is disposed in a plane that is parallel to both of the planes containing the first and second axially-facing surfaces 180, 182 of the travel brace body 172, it is not coplanar with either surface. Instead, the plane containing the bottom surface 196 is located between the planes containing the first and second axially-facing surfaces 180, 182. In an embodiment, the bottom surface 196 of the lobe(s) 194 engage the shoulder/ledge 64, and the engagement surface 66 thereof, in particular, when the petal assembly 14, the travel brace 98, and the spring 100 are assembled together in the housing assembly 12.

More specifically, when the housing assembly 12, the petal assembly 14, the travel brace 98, and the spring 100 are assembled together, the spring 100 is in a compressed state. As such, the spring 100 holds the travel brace 98 against the shoulder/ledge 64, and the surfaces 196 of the lobes rest against the surface 66 of the shoulder/ledge 64. In an embodiment wherein the gripper 10 includes the seal block 92, the spring also holds the seal block 92 against the surface 30 of the upper housing 16.

As described above, the petal holder 94 of the petal assembly 14 includes one or more lobe notches 158 each configured to receive a respective travel brace lobe 194. Accordingly, the travel brace lobe(s) 194 are sized and shaped such that they may be received in and move within and out of the lobe notches 158 of the petal holder 94.

In addition to the components described above, and as briefly described above, the petal assembly 14 further includes the return spring 100. The return spring 100 may comprise any suitable resilient and/or elastic device. For purposes of this disclosure, however, a coil spring, and a compression spring, in particular, is described and illustrated. It will be appreciated however that the present disclosure is not intended to be limited to any particular type(s) of elastic device(s) or spring(s).

The return spring 100 is configured to retract the petal assembly 14, and the seal block 92 and/or petal holder 94 thereof, in particular, from an advanced or extended position to a home position. More specifically, as pressure is applied to the petal assembly 14 as a result of fluid being introduced into the cavity 40 of the upper housing 16 via the pneumatic port 42, the petal holder 94 translates from a home position towards a container to be gripped. As the petal holder 94 translates further towards the container, the return spring 100 compresses. Once the gripper is depressurized (i.e., the provision of fluid ceases), the pressure applied to the spring 100 ceases and the spring 100 expands or decompresses and applies a biasing force on a component of the petal assembly 14 (e.g., the seal block 92 and/or the petal holder 94) to cause the petal assembly 14 (e.g., the seal block 92, the petal holder 94, and/or the petals 96) to retract from an advanced position back to the home position. As described above, in an embodiment, the spring 100 is also configured to hold the travel brace 98 against the shoulder/ledge 64 of the lower housing portion 18 of the housing assembly 12 whether the petal holder 94 regardless of the position of the petal holder 94 (e.g., advanced, home, or in between).

In an embodiment, the return spring 100 is held in compression between the travel brace 98 and one or more of the seal block 92 and the petal holder 94. More specifically, a first end 198 of the return spring 100 may be disposed over top of the spring centering post 192 of the travel brace 98 such that it circumscribes the axis 178 of the travel brace bode 172. A second end 200 of the spring 100 engages a portion of either the seal block 92 or the petal holder 94 of the petal assembly 14. As shown in FIG. 1, when the petal assembly 14 and housing assembly 12 are assembled together, the return spring 100 circumscribes the longitudinal axes of various components of both the housing assembly 12 (e.g., the axis 26 of the upper housing 16 and the axis 52 of the lower housing 18) and the petal assembly 14 (e.g., the axis 108 of the seal block 92, the axis 136 of the petal holder 94, and the axis 178 of the travel brace 98).

Figure 4:
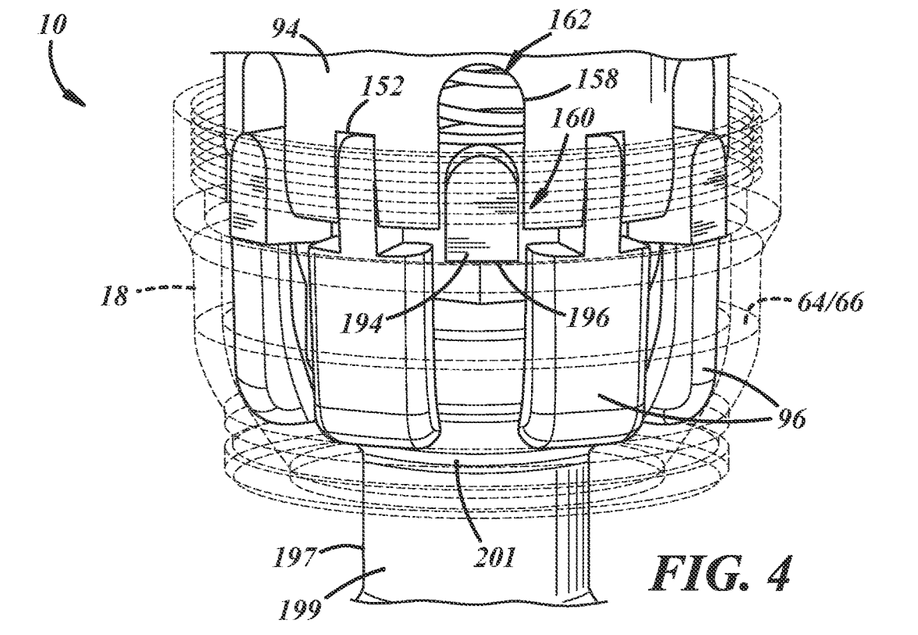
FIGS. 4 and 5 are perspective views of a portion of the container gripper illustrated in FIG. 1 in a retracted state and an extended state, respectively.
Figure 5:
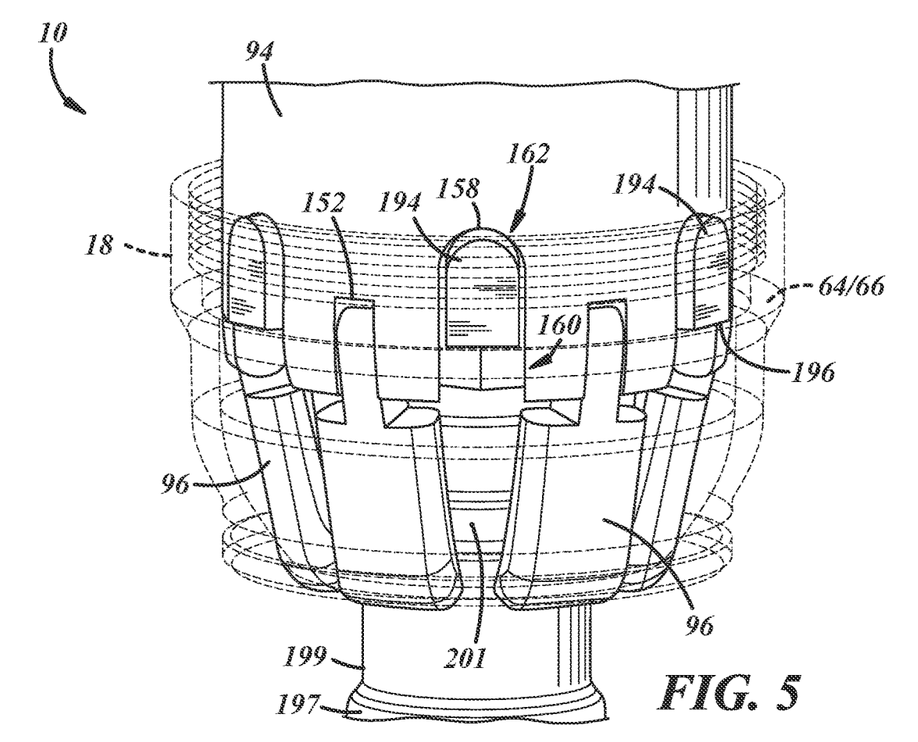

With general reference to FIG. 1 and particular reference to FIGS. 4 and 5, the operation of the illustrative embodiment of the gripper 10 shown in FIG. 1 will now be described. First, as shown in FIG. 4, the gripper 10 is positioned above or over a container 197 to be gripped, and a neck 199, and neck finish 201, thereof, in particular. This may comprise, for example, lowering the gripper 10 into the correct position. Next, with reference to FIG. 1, the gripper 10 is pressurized by introducing fluid (e.g., air) under pressure into the cavity 40 of the upper housing 16 of the housing assembly 12 via the pneumatic port 42. As the cavity 40 becomes pressurized and a pressure chamber is established in the cavity 40 of the upper housing 16, a force is applied to the petal assembly 14 driving it downward within the housing assembly 12, and the cavity 40 of the upper housing 16 and the cavity 60 of the lower housing 18. As the petal assembly 14, and the petal holder 94 thereof, in particular, moves or translates downwardly, the articulating petals 96 contact and ride along the inner surface 56 of the sidewall 54 of the lower housing 18 thereby guiding the petals 96 radially inwardly toward the container neck 199 and closing the petals 96 around the neck 199 until the petals 96 engage and grip the neck finish 201 of the container neck 199. The translation or downward stroke of the petal assembly 14 is, however, limited.

More specifically, and as shown in FIG. 4, as the petal assembly 14 translates downwardly towards the container 197, the return spring 100 compresses and the lobe notches 158 in the petal holder 94 progress downwardly over the lobes 194 of the travel brace 98 that are received in the notches 158. The petal assembly 14 may continue to translate further downwardly until the closed ends 162 of the lobe notches 158 engage the lobes 194 as shown in, for example, FIG. 5, at which point further downward translation of the petal holder 94 and petals 96 is limited/prevented by the travel brace 98. In other words, the combinations of the closed ends 162 of the lobe notches 158 and the lobes 194 of the travel brace serve as travel stops for the petal holder 94. The container may then be manipulated (e.g., moved, rotated, transferred, etc.) to, for example, digitally print one or more desired markings onto the container 197.

When the container 197 no longer needs to be manipulated, the gripper 10 may be disengaged from the container 197. This may comprise depressurizing the gripper 10 by, for example, ceasing the provision of fluid into the cavity 40 of the upper housing 16 of the housing assembly 12. As a result, the force being applied to the petal assembly 14 in the downward direction is reduced thereby allowing the compressed return spring 100 to decompress or expand and apply a bias force against the petal holder 94 or seal block 92 to retract the petal assembly 14. As the petal assembly 14, and the petal holder 94, in particular, retracts, the petals 96 move upwardly and ride along the along the inner surface 56 of the sidewall 54 of the lower housing 18 allowing the petals 96 to articulate radially outwardly away from the container neck 201.

FIGS. 6-12 depict another illustrative embodiment of the gripper 10 (i.e., gripper 10') and the petal assembly 14 (i.e., petal assembly 14') thereof, in particular. This embodiment is similar in many respects to the embodiment of FIGS. 1-5 and like numerals between the embodiments generally designate like or corresponding elements throughout the several views of the drawing figures. Accordingly, the descriptions of the embodiments are hereby incorporated into one another, and description of subject matter common to the embodiments generally may not be repeated.

Figure 6:
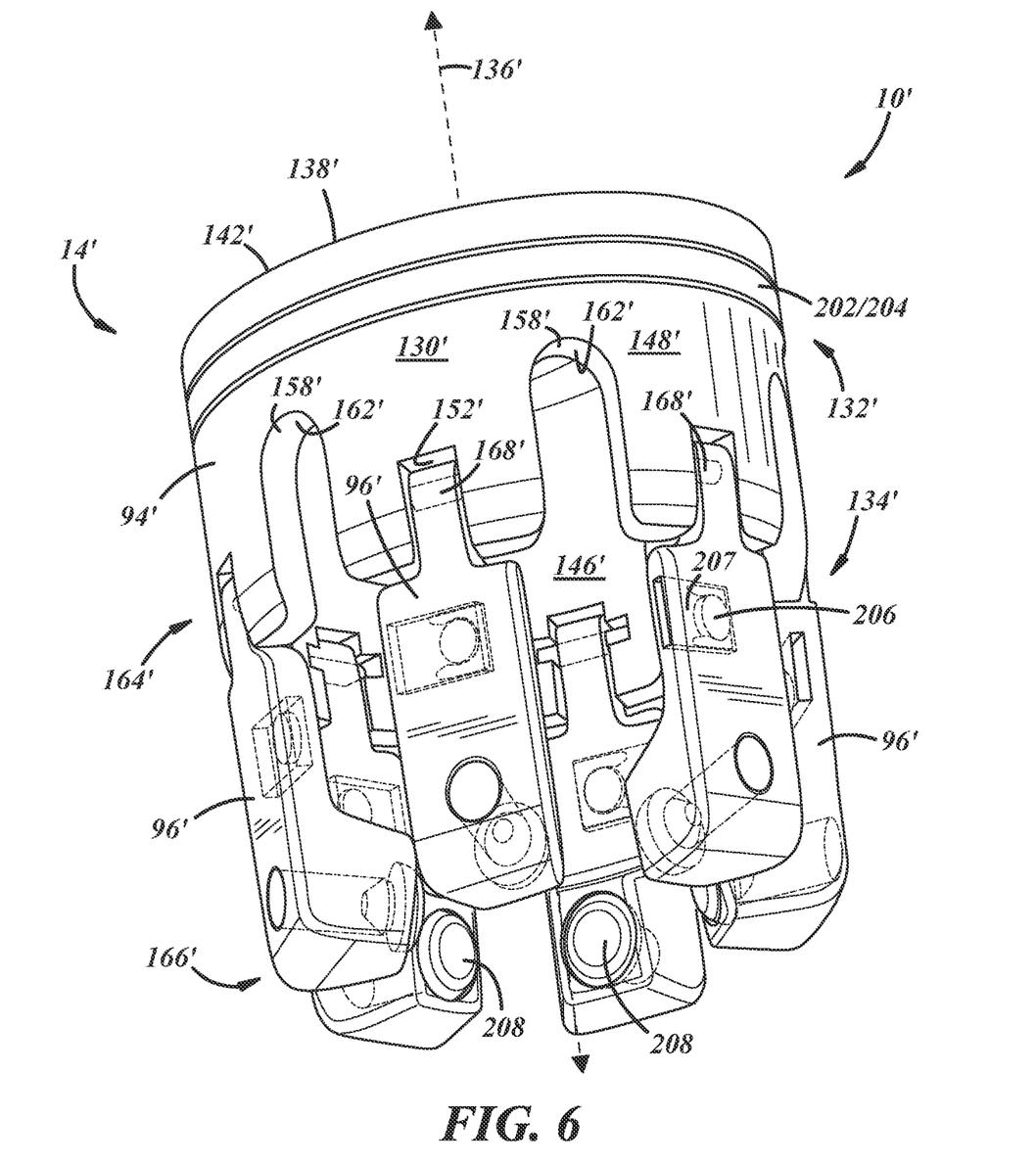
FIG. 6 is a perspective view of another illustrative embodiment of a petal holder for a container gripper.
Figure 7:
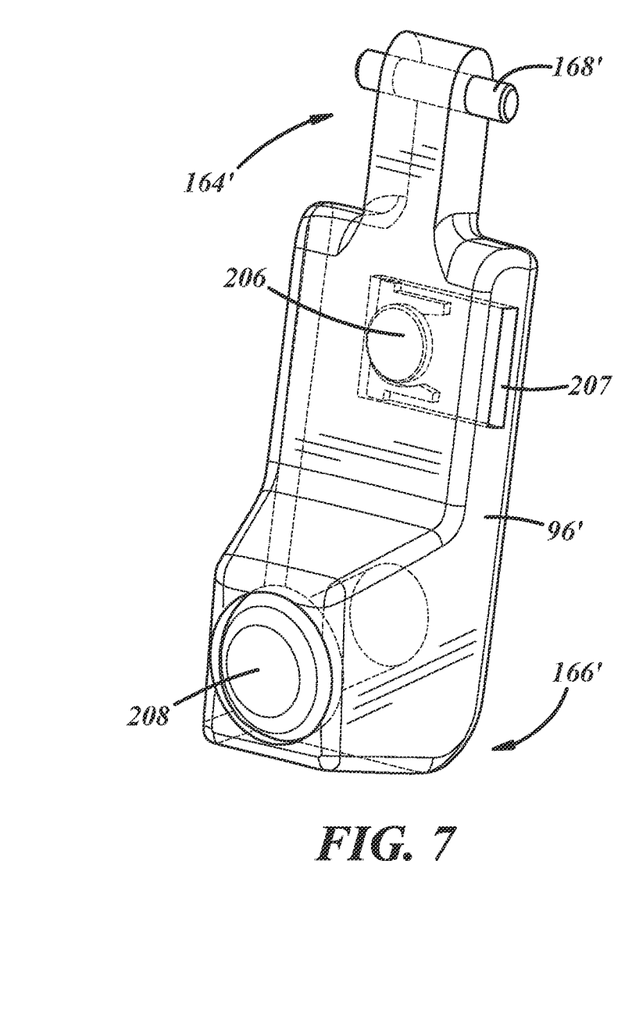
FIG. 7 is a perspective view of a petal configured to be coupled to the petal holder illustrated in FIG. 6.
Figure 11:
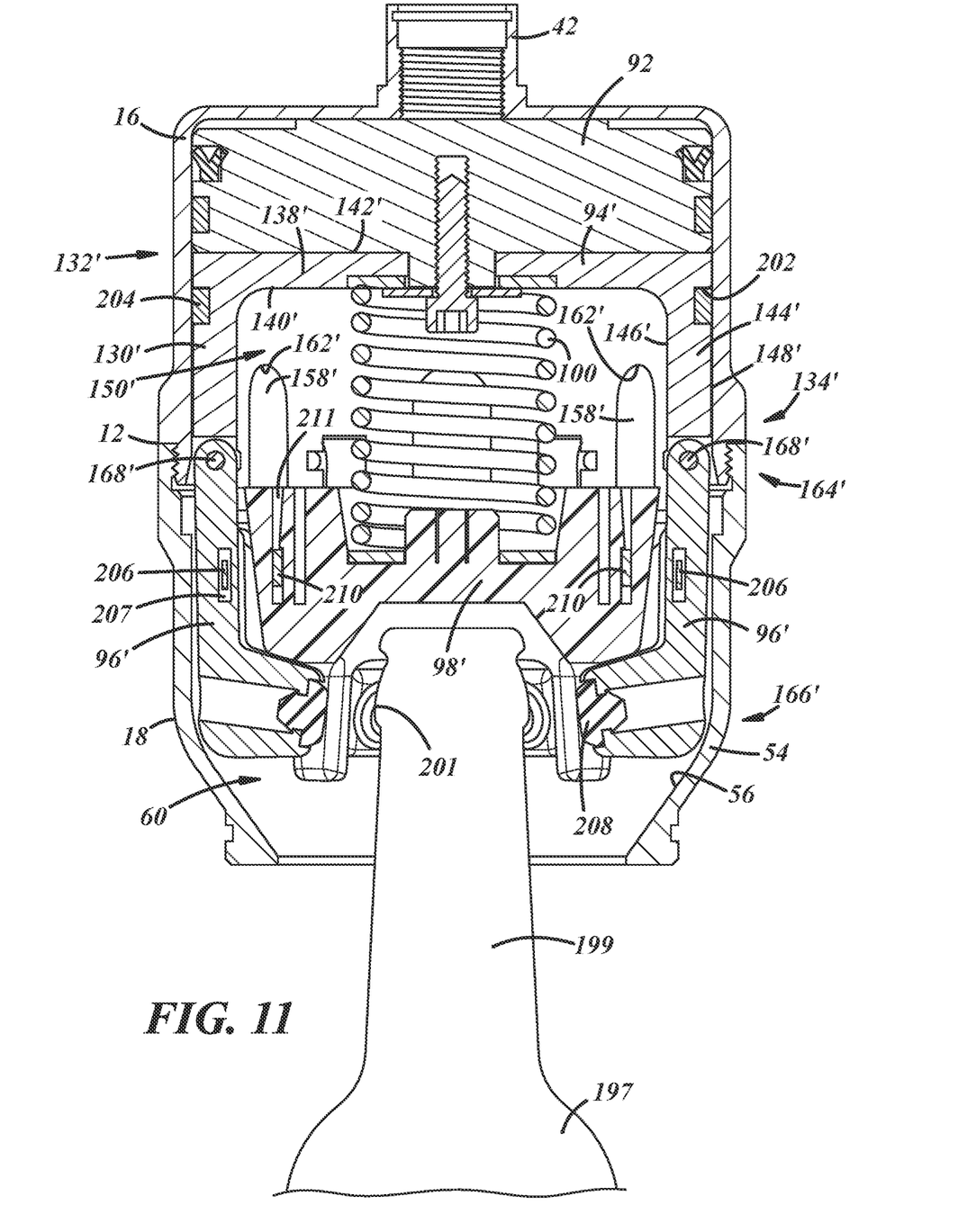
Figure 12:
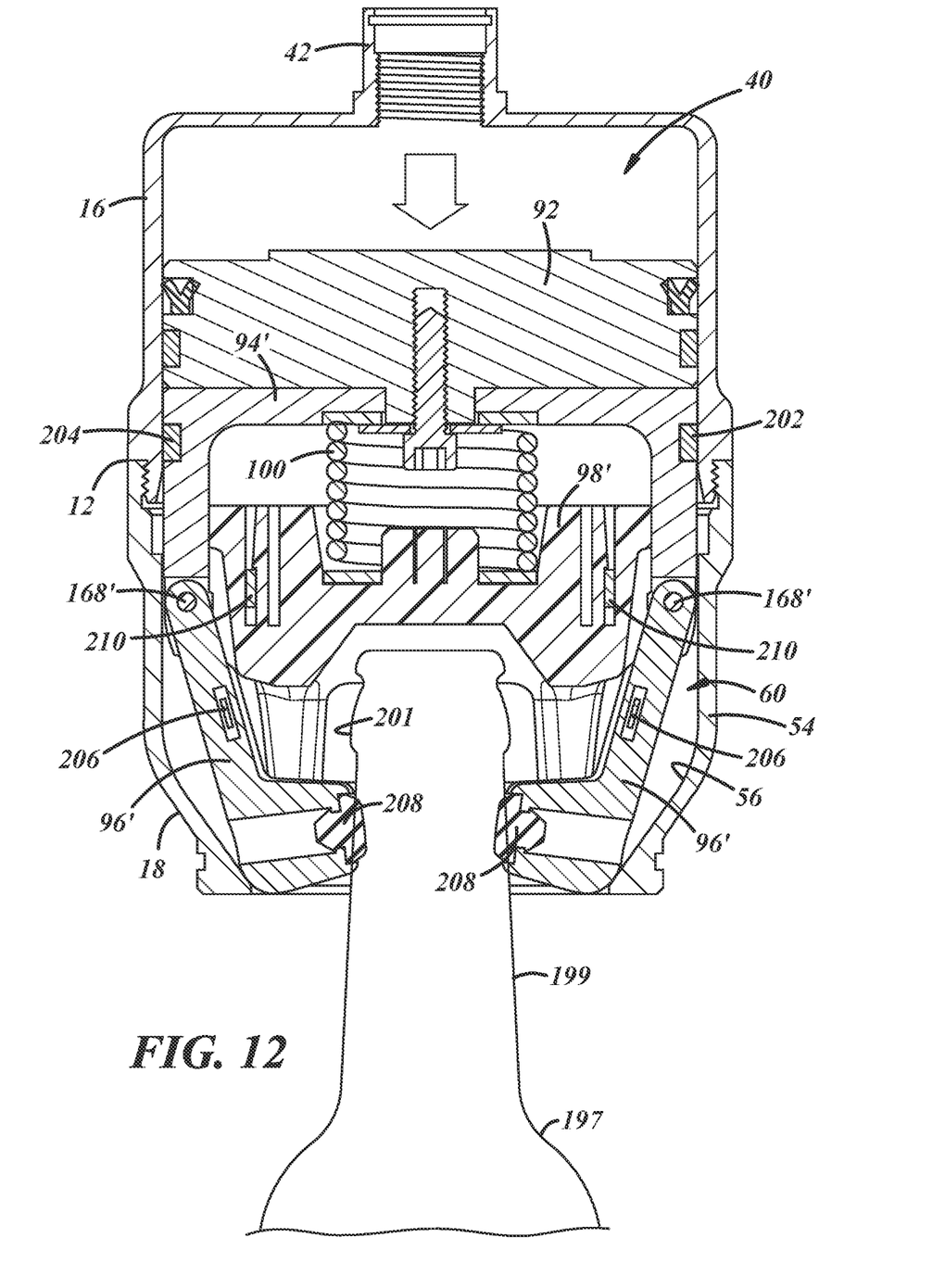

With particular reference to FIG. 6, as with the embodiment described above, the petal assembly 14' includes a petal holder 94' having a body 130'. The body 130' has a first or upper end 132', a second or lower end 134', and a longitudinal axis 136' extending through and between the upper and lower ends 132', 134'. As best shown in FIGS. 11 and 12, the petal holder body 130' may further include a base 138' disposed at the upper end 132' thereof having an axially-facing inner or interior surface 140' and an axially-facing outer or exterior surface 142' facing in an opposite direction as the interior surface 140', a sidewall 144' extending from the base 138' and terminating at the lower end 134' of the body 130' that has a radially inwardly-facing inner or interior surface 146' and a radially outwardly-facing outer or exterior surface 148', and a void or cavity 150' defined by the interior surface 146' of the sidewall 144' and/or the interior surface 140' of the base 138'. In other embodiments, the petal holder 94' may not have a base with interior and exterior facing surfaces but rather both the upper and lower ends of the body may be open.

In addition to the above, the body 130' may further include a circumferentially and radially-extending groove 202 in the radially outwardly facing surface 148' of the sidewall 144' that is configured to receive a guide ring 204. The groove 202 may be located anywhere along the longitudinal extent of the surface 148'. In the illustrative embodiment shown in FIG. 6, however, the groove 202 is located adjacent to the base 138' of the body 130', and the axially-facing outer or exterior surface 142' of the base 138', in particular.

The petal assembly 14' includes a plurality of circumferentially-spaced petals 96' that are coupled to the petal holder 94'. Each petal 96' has an upper end 164' and a lower end 166'. In an embodiment, the upper ends 164' of the petals 96' are configured to be pivotably coupled to the petal holder 94'. And in at least some embodiments, the petals 96' are formed of a rigid material so that they do not bend or deflect during operation of the gripper 10'. With reference to FIG. 6, each petal 96' is configured to be received in a respective petal notch 152' in the petal body 130', and pivotably coupled to the housing 130' within the petal notch 152' by a pivot pin 168' (best shown in FIGS. 6 and 7). The petals 96' are configured to rotate or articulate about the pivot pin 168'. The lower ends 166' of the petals 96' are configured to be guided by the lower housing 18 of the housing assembly 12 when the petal assembly 14' is assembled with the housing assembly 12. More specifically, and as will be described in greater detail below, as the petal assembly 14', and the petal holder 94' thereof, in particular, translates in the housing assembly 12, the interior surface 56 of the lower housing 18 acts as a cam surface along which the lower ends 166' of the petals 96' travel. The angled or inclined nature of the interior surface 56 of the lower housing 18 guides or causes the petals to move radially inwardly as the petal assembly 14' travels in the direction toward a container to be gripped, and guides or causes the petals 96' to move radially outwardly as the petal assembly 14' travels in a direction away from the container to be gripped.

In addition to the above, and for reasons that will be described below, in at least one embodiment, each of the petals 96' has a magnet 206 embedded therein between the upper and lower ends 166', 168' thereof. In such an embodiment, a given petal 96' may include a cavity or pocket 207 within which the magnet 206 may be inserted and carried or held. In other embodiments, the petal 96' may be molded over the magnet 206 during the manufacture of the petal 96', or may be affixed or attached to the petal 96' using any suitable technique known in the art (e.g., adhesives, fasteners, etc.).

Whether or not the petals 96' include magnets 206, in at least some embodiments, some or all of the petals 96' may include a rubber tab 208 at the lower end 168' thereof. As shown in, for example, FIG. 6, for a given petal 96' the rubber tab 208 may extend from a surface of the petal 96' in a radially inwardly direction relative to the longitudinal axis 136' of the petal holder 94' (i.e., towards both the container to be gripped and the other petals). The rubber tab 208 is configured to engage the outer surface of the container to be gripped and is intended to provide stability in the gripping of the container. The rubber tab 208 may be affixed to the petal 96' using any suitable technique (e.g., adhesive or fastener), the petal 96' may be formed over a portion of the rubber tab 208, or the rubber tab 208 may be otherwise coupled with the petal 96' using any other suitable technique.

Figure 8:
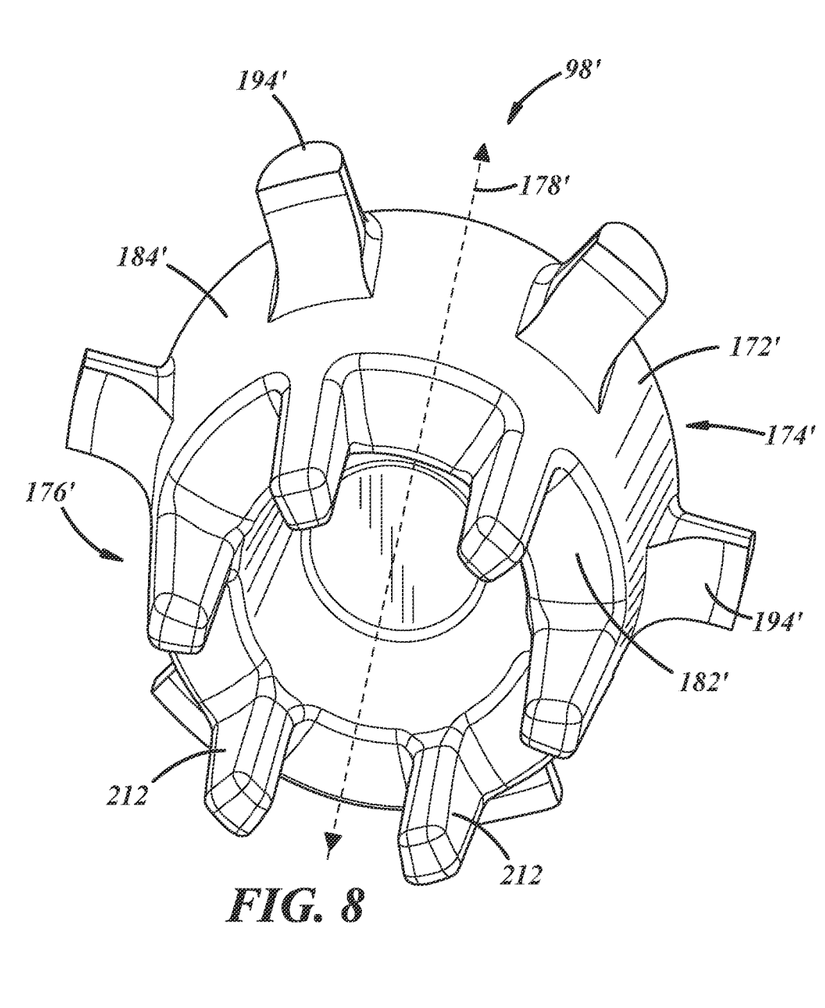
FIGS. 8 and 9 are perspective views of another illustrative embodiment of a travel brace for a gripper.
Figure 9:
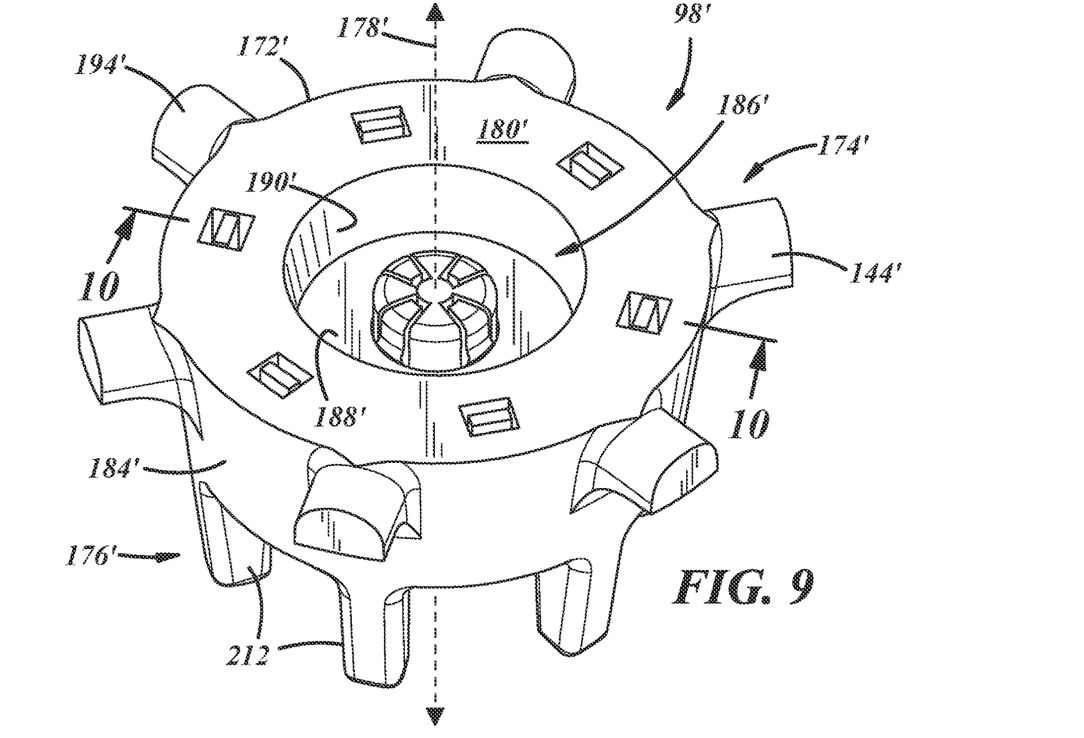
Figure 10:
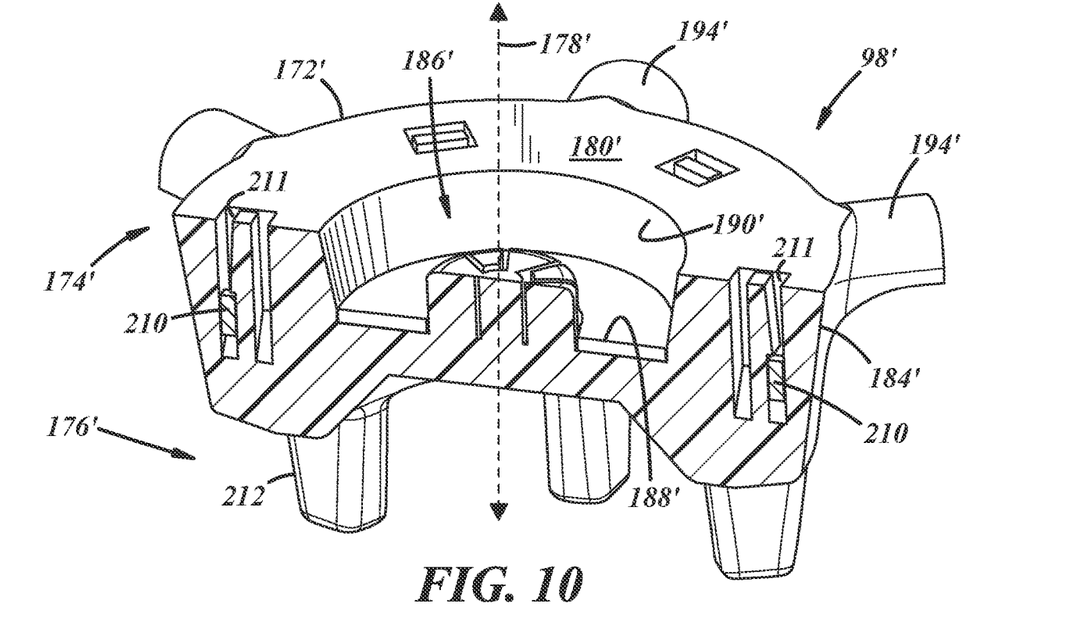
FIG. 10 is a perspective and cross-sectional view of the travel brace illustrated in FIGS. 8 and 9 taken along the line 10-10 in FIG. 9.

With reference to FIGS. 8-10, in an embodiment, the petal assembly 14' further comprises a travel brace 98' that includes a body 172' having a first or upper end 174', a second or lower end 176', and a longitudinal axis 178' extending between and through the upper and lower ends 174', 176'. The body 172' may further include a first axially-facing surface 180' at the upper end 174' (best shown in FIGS. 9 and 10, a second axially-facing surface 182' (best shown in FIG. 8) at the lower end 176' facing in the opposite direction as the first axially-facing surface 180', and a radially-facing circumferentially-extending surface 184' disposed and extending axially between the first and second axially-facing surfaces 180', 182'. In the embodiment illustrated in FIGS. 8 and 9, the travel brace body 172' has a substantially circular shape. It will be appreciated, however, that the body 172' may have any suitable shape, and as such, the present disclosure is not limited to any particular shape(s).

As with the embodiment described above, in an embodiment, the travel brace 98' may further include a recess 186' in the body 172' at the upper end 174' thereof. The recess 186' is disposed radially inwardly of the first axially-facing surface 180' and extends axially into the body 172' from the first axially-facing surface 180' toward the lower end 176' and second axially-facing surface 182' of the travel brace body 172'. The recess 186' may be defined by an axially-facing base surface 188' and a radially inwardly-facing sidewall 190'.

In an embodiment, the travel brace 98' may include one or more lobes 194' extending radially outwardly from the travel brace body 172' that is/are configured to engage the shoulder/ledge 64 of the lower housing 18 of the housing assembly 12. For example, in the embodiment illustrated in FIGS. 8 and 9, the travel brace 98' includes a plurality of lobes 194' extending from the radially outwardly-facing surface 184' of the travel brace body 172'. In an embodiment wherein the travel brace 98' includes a plurality of lobes 194', the lobes may be circumferentially or laterally-spaced about the travel brace body 172'. For example, in the illustrative embodiment depicted in FIGS. 8 and 9, the travel brace 98' includes six lobes 194' circumferentially spaced about the travel brace body 172'.

In addition to the above, in an embodiment such as that illustrated in FIG. 10, the travel brace 98' may further include one or magnets 210 disposed in the travel brace body 172'. In such an embodiment, each of the magnets 210 is located between a respective pair of adjacent lobes 194' such that the location of each magnet 210 would correspond to the location of a respective one of the petals 96' of the petal assembly 14' when the pedal holder 94', travel brace 98', and spring 100 of the gripper 10' are assembled together. As with the magnets 206 of the petals 96', the travel brace body 172' may have one or more cavities or pockets 211 therein each configured to receive a magnet 210. In other embodiments, the body 172' may be molded over the magnets 210 during the manufacture of the brace body 172', or the magnets 210 may be attached or affixed to the travel brace 98' using any other suitable technique (e.g., adhesive, fasteners, etc.).

The purpose of the magnets 206 in the petals 96' and the magnets 210 in the travel brace body 172' is to hold the petals 96' apart from each other when the petal assembly 14' is in a retracted state. More specifically, when the petal assembly 14' is in a retracted state (best shown in FIG. 11), each of the magnets 206 in the petals 96' is axially offset from and at least partially axially overlaps a respective one of the magnets 210 in the travel brace body 172'. For each magnet pair, the magnets 206, 210 are oriented such that the same poles of the magnets 206, 210 face each other, resulting in the magnets 206, 210 repelling each other due to the magnetic force generated therebetween. Because each of the petals 96' freely rotates about its corresponding pivot pin 168', the repelling of the magnets causes the petals 96' to rotate away from the travel brace 98' and be effectively pinned against the inner surface 56 of the lower housing portion 18 of the housing assembly 12, thereby maximizing the inner diameter of the petal assembly 14'. As the petal holder 94' translates downwardly toward a container to be gripped, however, the magnets 206, 210 move out of axial alignment and the repelling action therebetween ceases, allowing the petals 96' to rotate/move radially inwardly toward the travel brace 98' and each other.

While in the embodiment above magnets are used to push the petals 96' radially outwardly when the petal assembly 14' is in the retracted state, it will be appreciated by those having ordinary skill in the art that any suitable biasing mechanism and arrangement may be used instead. For example, a number of springs or other resilient elements may be used for the same purpose the magnets 206, 210 are used, and therefore, the present disclosure is not intended to be limited solely to the use of magnets but rather any suitable biasing mechanism may be used instead.

Whether or not the travel brace 98' includes the magnets 210, in an embodiment such as that illustrated in FIGS. 8 and 9, the travel brace 98' may include a plurality of legs 212 extending from the axially-facing surface 182' and away from the travel brace body 172' in an axial direction. For example, in the embodiment illustrated in FIGS. 8 and 9, the travel brace 98' includes a plurality of legs 212 extending from the axially-facing surface 182' of the travel brace body 172'. In an embodiment wherein the travel brace 98' includes a plurality of lobes 194', each of the legs 212 may be in alignment with a respective one of the lobes 194'. In any event, the legs 212 may be laterally spaced apart about the travel brace body 172'. The legs 212 are configured to act as lead-in guides to center a container to be gripped by the gripper 10' with respect to the petal assembly 14'.

With reference to FIGS. 11 and 12, the operation of the illustrative embodiment of the gripper 10' shown in FIGS. 6-10 will now be described. First, as shown in FIG. 11, the gripper 10' is positioned above or over the container 197 to be gripped, and the neck 199 and neck finish 201 thereof, in particular. This may comprise, for example, lowering the gripper 10' into the correct position. Next, the gripper 10' is pressurized by introducing fluid (e.g., air) under pressure into the cavity 40 of the upper housing 16 of the housing assembly 12 via the pneumatic port 42. As shown in FIG. 12, as the cavity 40 becomes pressurized and a pressure chamber is established in the cavity 40 of the upper housing 16, a force is applied to the petal assembly 14' driving it downward within the housing assembly 12, and the cavity 40 of the upper housing 16 and the cavity 60 of the lower housing 18, in particular. As the petal assembly 14' (e.g., the petal holder 94') moves or translates downwardly, the articulating petals 96' contact and ride along the inner surface 56 of the sidewall 54 of the lower housing 18, thereby guiding the petals 96' radially inwardly toward the container neck 199 and closing the petals 96' around the neck 199 until the petals 96', and the rubber tabs 208 thereof, in particular, engage and grip the neck finish 201 of the container neck 199, as shown in FIG. 12. As with the embodiment described above, the translation or downward stroke of the petal assembly 14' is, however, limited.

More specifically, as the petal assembly 14', and the petal holder 94' thereof, in particular, translates downwardly towards the container 197, the return spring 100 compresses and lobe notches 158' in the petal holder 94' (best shown in FIG. 11) progress downwardly over the lobes 194' of the travel brace 98', and the lobes 194' are received in the notches 158'. The petal assembly 14' may continue to translate further downwardly until closed ends 162' of the lobe notches 158' engage the lobes 194', at which point further downward translation of the petal holder 94' and petals 96' is limited/prevented by the travel brace 98'. The container 197 may then be manipulated (e.g., moved, rotated, transferred, etc.) to, for example, digitally print one or more desired markings onto the container 197.

When the container 197 no longer needs to be manipulated, the gripper 10' may be disengaged from the container 197. This may comprise depressurizing the gripper 10' by, for example, ceasing the provision of fluid into the cavity 40 of the upper housing 16 of the housing assembly 12. As a result, the force being applied to the petal assembly 14' in the downward direction is reduced, thereby allowing the compressed return spring 100 to decompress or expand and apply a biasing force against the petal holder 94' or seal block 92 to retract the petal assembly 14'. As the petal assembly 14', and the petal holder 94', in particular, retracts, the petals 96' move upwardly and ride along the along the inner surface 56 of the sidewall 54 of the lower housing 18 allowing the petals 96' to articulate radially outwardly away from the container neck 199. And as each of the petals 96' reaches a position where the magnet 210 therein at least partially axially overlap one of the magnets 206 in the travel brace 98', the magnets 206, 210 repel each other due to the magnetic force generated between resulting in the pushing of the petal 96' outwardly and pinning it against the inner surface 56 of the lower housing 18.

The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A container gripper, comprising:
   a housing; and
   a petal assembly configured to be carried in the housing, and including
   a petal holder configured to be translatably carried within the housing,
   a plurality of circumferentially-spaced articulating petals having upper ends pivotably coupled to the petal holder and lower ends configured to be guided by the housing,
   a travel brace configured to limit the translation of the petal holder, and
   a return spring configured to be held between the travel brace and the petal holder.

2. The container gripper of claim 1, wherein the housing comprises a housing assembly including:
   an upper housing including a lower end; and
   a lower housing coupled to the lower end of the upper housing.

3. The container gripper of claim 2, wherein the lower housing has a sidewall with an upper end configured to be coupled to the lower end of the upper housing and a lower end that is diametrically smaller than the upper end to guide the petals radially inwardly.

4. The container gripper of claim 3, wherein the diameter of the lower end of the sidewall progressively narrows as it extends away from the upper end of the sidewall in an axial direction.

5. The container gripper of claim 1, wherein each of the plurality of petals includes a rubber tab at the lower end thereof extending from a surface of the petal in a direction toward the other of the plurality of petals.

6. The container gripper of claim 1, wherein the travel brace includes a plurality of radially-extending lobes, and the petal holder includes a lower end including a plurality of petal notches to receive upper portions of the petals, and a plurality of lobe notches configured to receive the lobes of the travel brace.

7. The container gripper of claim 6, wherein the housing has a travel brace shoulder against which the travel brace lobes are configured to rest.

8. The container gripper of claim 1, wherein the petal holder is configured for translation relative to the travel brace and is configured to move over top of the travel brace.

9. The container gripper of claim 1, wherein the petal assembly further includes a seal block configured to be translatably carried in the housing, and wherein the return spring is configured to be held between the travel brace and the petal holder and/or the seal block.

10. A method of using the container gripper of claim 1, comprising:
    lowering the container gripper over a container neck; and
    pressurizing the container gripper to drive the petal assembly downward within the housing so that the articulating petals move radially inwardly toward the container neck and engage and grip the neck finish of the container.

11. The method of claim 10, further comprising:
    depressurizing the container gripper to allow the return spring to apply a biasing force against the petal holder to retract the petal holder causing the petals to move radially outwardly away from the container neck.

12. The gripper of claim 1, further comprising a container guide coupled to the housing at a lower end of the housing.

13. The gripper of claim 1, wherein the petal holder includes a body having a cavity and wherein the travel brace is disposed in the cavity of the body of the petal holder.

14. The gripper of claim 1, wherein as the petal holder translates downwardly, the petals contact and ride along an inner surface of the housing thereby guiding the petals radially inwardly.

15. A container gripper, comprising:
a housing; and
a petal assembly configured to be carried in the housing, and including
 a petal holder configured to be translatably carried within the housing,
 a plurality of circumferentially-spaced articulating petals having upper ends pivotably coupled to the petal holder and lower ends configured to be guided by the housing, wherein each of the plurality of petals includes a magnet,
 a travel brace configured to limit the translation of the petal holder, wherein the travel brace includes a plurality of magnets, and
 a return spring configured to be held between the travel brace and the petal holder,
 wherein when the petal assembly is in a retracted state, each petal is pushed radially outwardly by a repelling magnetic force generated between the magnet in the petal and a respective magnet of the travel brace.

16. The gripper of claim 15, wherein each of the plurality of petals includes a rubber tab at the lower end thereof extending from a surface of the petal in a direction toward the other of the plurality of petals.

17. The gripper of claim 15, wherein the travel brace includes one or more radially-extending lobes, and the petal holder includes a lower end including a plurality of petal notches to receive upper portions of the petals, and one or more lobe notches each configured to receive one of the one or more radially-extending lobes of the travel brace.

18. The gripper of claim 17, wherein the housing has a travel brace shoulder and wherein the one or more radially-extending lobes rest against the travel brace shoulder.

19. The gripper of claim 15, wherein the petal holder is configured for translation relative to the travel brace and is configured to move over top of the travel brace.

20. The gripper of claim 15, wherein the petal assembly further includes a seal block configured to be translatably carried in the housing, and wherein the return spring is configured to be held between the travel brace and petal holder and/or seal block.

21. The gripper of claim 15, wherein the articulating petals are rigid.

22. A container gripper, comprising:
a housing; and
a petal assembly configured to be carried in the housing, and including
 a seal block,
 a petal holder configured to be coupled to the seal block, wherein the petal holder and the seal block are configured to be translatably carried within the housing,
 a plurality of circumferentially-spaced rigid articulating petals having upper ends pivotably coupled to the petal holder and lower ends configured to be guided by the housing, wherein each of the plurality of petals includes a magnet,
 a travel brace configured to limit the translation of the seal block and petal holder, wherein the travel brace includes a plurality of magnets, and
 a return spring configured to be held between the travel brace and the seal block and/or the petal holder,
 wherein when the petal assembly is in a retracted state, each petal is pushed radially outwardly by a magnetic force generated between the magnet in the petal and a respective magnet of the travel brace.

23. The gripper of claim 22, wherein each of the plurality of petals includes a rubber tab at the lower end thereof extending from a surface of the petal toward the other of the plurality of petals.

24. The gripper of claim 22, wherein the travel brace includes one or more radially outwardly extending lobes, and the petal holder includes a lower end including a plurality of petal notches to receive upper portions of the petals and one or more lobe notches each configured to receive one of the one or more lobes of the travel brace, and further wherein the housing has a travel brace shoulder against which the travel brace lobes are configured to rest.

* * * * *